United States Patent Office 3,437,902
Patented Apr. 8, 1969

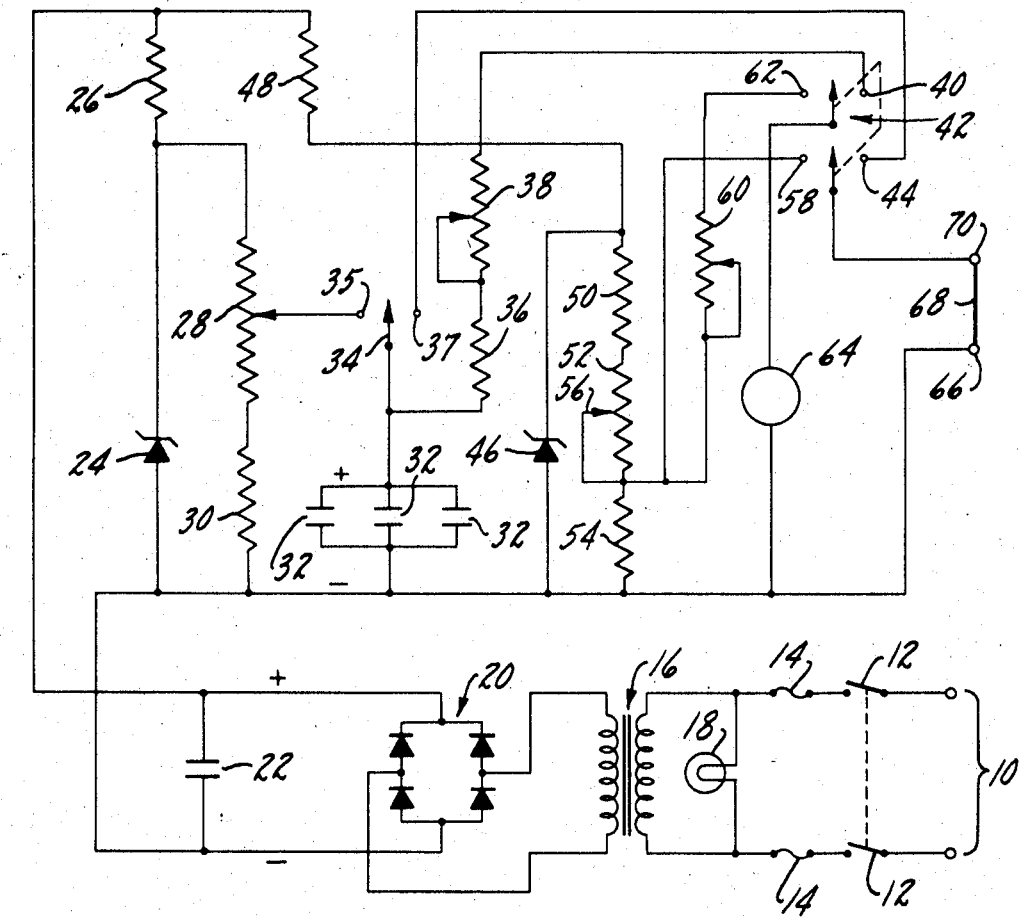

3,437,902
FIRING CONTROL CIRCUIT
John E. Jones, Jr., Zion, Ill., assignor to Fuel Research & Instrument Co., Chicago, Ill., a corporation of Illinois
Filed Dec. 9, 1965, Ser. No. 512,640
Int. Cl. G01r 27/26, 11/52
U.S. Cl. 320—1                           9 Claims This invention relates to a firing control circuit for use with calorimeters of the type in which a sample of material is ignited by passing an electric current through a wire in close proximity to or in contact with the sample to be burned.

A primary purpose of the invention is a firing control circuit of the type described which includes means for measuring the energy dissipated in igniting the wire.

Another purpose is a reliably operable compact and efficient firing control circuit of the type described.

Another purpose is a firing control circuit in which the amount of energy supplied through the wire for igniting it can be controlled.

Another purpose is a firing control circuit of the type described utilizing a plurality of parallel connected capacitors for providing the energy to a wire for igniting it.

Other purposes will appear in the ensuing specification, drawing and claims.

The invention is illustrated diagrammatically in the attached circuit diagram illustrating a preferred form of the invention.

The present invention has primary utilization with calorimeters of the type manufactured by the Parr Instrument Company of Moline, Illinois. Such calorimeters are utilized to measure the heat of combustion of various samples of material, for example coal. Using coal as an example, a gram of coal may be placed within the calorimeter, preferably in a crucible. A wire, which is in essence a resistive component, is placed either in contact with the sample of coal, or in close proximity to it. A firing current is passed through the wire and is of sufficient value and has sufficient energy to cause the wire and subsequently the sample to ignite and burn. The coal and wire are normally in a controlled atmospheric environment which is conducive to burning, for example an oxygen atmosphere.

The present invention is specifically directed to a firing circuit for such a use in which the amount of energy provided for ignition is controlled and in which the amount of energy consumed in igniting the wire can be measured.

As illustrated in the drawings, a conventional AC source 10 may be connected through a switch 12, and fuses 14 to a transformer 16. An on-off light 18 may be connected across the primary of the transformer 16. The secondary of the transformer 16 may be connected to a full wave rectifier 20 which provides a DC output. In the alternative, if DC is available, a rectifier is not needed and the DC may be used directly to charge the capacitors described hereinafter.

Connected across the rectifier 20 is a filter capacitor 22, which will charge in the polarity indicated from the rectifier. Also connected across the rectifier and across capacitor 22 is a series combination of a Zener diode 24 and a resistance 26. The resistance 26 is a dropping resistor for the Zener diode and controls the amount of current through the diode. Connected in parallel with the diode 24 is a variable resistance 28 and a fixed resistance 30. This combination of resistances forms a voltage divider for use in charging the capacitors.

A plurality of capacitors 32 may be connected in parallel with the bottom of the parallel combination connected to the bottom of resistor 30 and the top of the parallel combination of capacitors connected to a two-position switch 34. A terminal 35 of the switch 34 is connected to the arm of variable resistance 28 so that when switch 34 is in the left-hand position, the parallel combination of capacitors will be charged from the source 10 through the rectifier 20. The voltage which will be applied to the capacitors, to charge them, will be determined by the position of variable resistance 28. The Zener diode is effective to regulate the voltage across the voltage divider and consequently the voltage to which the capacitor is charged.

Although three parallel capacitors have been shown, it should be understood that any number of capacitors may be utilized. A single capacitor of sufficient size may be satisfactory as may any number of parallel capacitors. What is important is to provide an energy source which can be charged from a conventional source of electric power.

Connected to the top side of the capacitor combination 32 is a fixed resistance 36 and a variable resistance 38. The top side of variable resistance 38 is connected to terminal 40 of a two-position switch indicated generally at 42. Terminal 37 of switch 34 is connected to terminal 44 of switch 42. The bottom side of the capacitor combination 32 is connected to a second Zener diode 46, the top of which is connected to a resistance 48, with resistance 48 again controlling the current through the diode in the same manner as resistance 26. A resistive combination is connected in parallel with Zener diode 46 and may include a fixed resistance 50, a variable resistance 52, and a bottom fixed resistance 54. The top of resistance 54 is connected directly to terminal 58 of switch 42 as well as through a variable resistance 60 and then to terminal 62 of switch 42. A meter 64 may be connected at the bottom side, to the bottom of capacitor combination 32, and at the top to the movable arm of switch 42. The bottom side of meter 64 is also connected to an output terminal 66, and as shown herein, a resistive component or resistive element or wire 68 is connected between output terminal 66 and a second output terminal 70. Terminal 70 in turn is connected to the lower movable arm of switch 42.

The use, operation and function of the invention are as follows:

The present invention is specifically directed to providing an energy source which will supply an electric current through an electric component, which may for example be a wire of a predetermined thickness, length and weight. When switch 12 is closed, the rectifier 20 will supply a DC voltage across the capacitor combination 32 assuming switch 34 is in the left-hand position. The amount of voltage applied to the capacitor is determined by the setting of variable resistance 28. It is preferred that the amount of energy available for igniting the wire and sample be generally constant.

Switch 42 can be placed in the left-hand or "resistance" position, in which meter 64 will function as an ohmmeter to make sure that there is continuity through wire 68. Switch 42 can then be placed in the right-hand position, which is the "ready" position. In this position the meter functions as a variable voltmeter and it can be used to indicate the energy stored in the capacitor combination 32. The energy actually read by the meter in this position of switch 42 will be in joules; however, the meter can be calibrated in any suitable parameter, for example heat energy units. Variable resistances 60, 56 and 38 can be used in setting the meter and normally will be calibrated at the factory and thereafter generally fixed in position.

Switch 34 can then be moved to the right-hand or firing position in which case the capacitor combination will be directly connected across the wire 68. The capacitor will discharge through the wire 68 and the energy supplied will be sufficient to heat up wire 68 to the point where it will ignite. Once it starts to burn it will of course break as it is essentially a small wire. As soon as it does break there can be no further discharge of the capacitor combination 32. Meter 64 is still connected across the capacitor combination and it will then read a new value, which will indicate the amount of energy dissipated in the ignition process. This last reading is particularly important as it is necessary in calorimeters of the type described to know the B.t.u. that are expended in igniting the wire. If the meter is initially calibrated and adjusted to read zero B.t.u. before the capacitors have discharged, then going down-scale as energy is dissipated in the element 68, the final reading of the meter will indicate the number of B.t.u. or calories, or other units, which have been dissipated in the actual ignition of the wire. In effect, however, meter 64 is reading the amount of energy remaining in the capacitor combination 32.

It is particularly advantageous to be able to measure not only the amount of energy initially in the capacitor, but the amount of energy remaining after the capacitors have discharged as this gives a true and quick indication of the energy expended in igniting the wire. Also it is important to be able to read the initial energy in the capacitors to determine if the capacitors do, in fact, have the proper charge.

The capacitors may vary in their manufacturing tolerances and it is desirable to always have available the same initial charge. Resistors 28 and 38 may be calibrated at the factory to compensate for manufacturing variations in the capacitors.

The meter circuit is important as it provides not only the two readings discussed above, but also a continuity reading to indicate that the resistive component is properly set up for the firing charge.

Whereas the preferred form of the invention has been shown and described herein, it should be realized that there are many modifications, substitutions and alterations thereto within the scope of the following claims.

I claim:
1. In a circuit for providing electric energy to an electric component of a sufficient value to cause ignition of said component, a source of electric power, at least one capacitor, circuit means connecting said capacitor and said source and including means for charging said capacitor, circuit means for adjusting the charge on said capacitor, switch means for connecting said capacitor with said electric component, and circuit means for measuring the amount of energy stored in said capacitor prior to connection to said component and for measuring the amount of energy dissipated in said component, prior to the time it is burned.

2. The circuit of claim 1 further characterized in that there are a plurality of capacitors, all connected in parallel with each other.

3. The circuit of claim 1 further characterized in that the circuit means connecting said capacitor and said source and including means for charging said capacitor includes a variable resistance in parallel with said capacitor, and a Zener diode in parallel with said variable resistance.

4. The circuit of claim 3 further characterized in that said source is an AC source, a resistance in series with said Zener diode, and a rectifier connected to said AC source and connected across the series combination of said Zener diode and said resistance.

5. The circuit of claim 1 further characterized in that said switch means connects said capacitor either to said source, for charging, or to said electric component, for dissipating at least a portion of the charge in said capacitor.

6. The circuit of claim 1 further characterized in that said measuring circuit means includes a meter and a switch, in one position, said switch connecting said meter to read the energy in said capacitor.

7. The circuit of claim 6 further characterized in that a second position of said switch connects said meter to provide an indication of circuit continuity through said electric component.

8. The circuit of claim 6 further characterized in that said meter is connected directly to said switch, and a variable resistance connected across said meter and switch, when the switch is in said first-named position.

9. The circuit of claim 8 further characterized by and including a Zener diode connected across the variable resistance which is connected across the combination of said meter and switch.

References Cited

UNITED STATES PATENTS

| | | | |
|---|---|---|---|
| 2,645,755 | 7/1953 | Garfield | 324—111 X |
| 2,943,255 | 6/1960 | DuFresne et al. | 320—1 |
| 3,218,508 | 11/1965 | Holce | 317—79 X |
| 3,229,695 | 12/1965 | Kapp et al. | 317—80 X |

TERRELL W. FEARS, *Primary Examiner.*

J. F. BREIMAYER, *Assistant Examiner.*

U.S. Cl. X.R.

324—60, 111; 317—79